United States Patent
Schmitt et al.

(10) Patent No.: US 11,437,668 B2
(45) Date of Patent: Sep. 6, 2022

(54) COOLING PLATE FOR CONTROLLING THE TEMPERATURE OF AT LEAST ONE BATTERY CELL, AND BATTERY SYSTEM

(71) Applicant: Robert Bosch GmbH, Stuttgart (DE)

(72) Inventors: Markus Schmitt, Tamm (DE); Andreas Ruehle, Bietigheim-Bissingen (DE); Benjamin Kopp, Remseck am Neckar (DE)

(73) Assignee: Robert Bosch GmbH, Stuttgart (DE)

( * ) Notice: Subject to any disclaimer, the term of this patent is extended or adjusted under 35 U.S.C. 154(b) by 63 days.

(21) Appl. No.: 16/578,594

(22) Filed: Sep. 23, 2019

(65) Prior Publication Data

US 2020/0106144 A1 Apr. 2, 2020

(30) Foreign Application Priority Data

Sep. 28, 2018 (DE) ...................... 10 2018 216 713.3

(51) Int. Cl.
| | |
|---|---|
| *H01M 10/6554* | (2014.01) |
| *F28F 13/12* | (2006.01) |
| *H01M 10/6556* | (2014.01) |
| *H01M 10/6568* | (2014.01) |
| *H01M 10/613* | (2014.01) |

(52) U.S. Cl.
CPC ......... *H01M 10/6554* (2015.04); *F28F 13/12* (2013.01); *H01M 10/613* (2015.04); *H01M 10/6556* (2015.04); *H01M 10/6568* (2015.04)

(58) Field of Classification Search
CPC ........... H01M 10/613; H01M 10/6554; H01M 10/6556; H01M 10/6568
See application file for complete search history.

(56) References Cited

U.S. PATENT DOCUMENTS 5,205,348 A * 4/1993 Tousignant ............... F28F 3/12
165/170
2019/0366877 A1* 12/2019 Blersch ............ H01M 10/6556

FOREIGN PATENT DOCUMENTS

| DE | 102014202535 A1 | 8/2015 | |
|---|---|---|---|
| DE | 102018000759 A1 * | 7/2018 | .......... H01M 10/647 |
| DE | 102017202552 A1 * | 8/2018 | ............ B23K 26/32 |
| EP | 0516280 | 12/1992 | |

OTHER PUBLICATIONS

DE-102018000759-A1 English machine translation (Year: 2021).*

* cited by examiner

*Primary Examiner* — Ula C Ruddock
*Assistant Examiner* — Armindo Carvalho, Jr.
(74) *Attorney, Agent, or Firm* — Michael Best & Friedrich LLP

(57) ABSTRACT

A cooling plate (10) for controlling the temperature of at least one battery cell, in particular for a traction battery, having a frame (12), which forms a flow chamber (16) for a coolant to flow through, and a cover (14) of flexible design which delimits the flow chamber (16) in an at least partially fluid-tight manner and is provided for making thermal contact with the at least one battery cell. It is proposed that the cooling plate (10) has at least one supporting element (30), which is arranged within the flow chamber (16) and around which coolant can flow, for increasing the turbulence in the coolant flowing through the flow chamber (16) and for supporting the at least one battery cell, which supporting element makes mechanical contact with the cover (14) of flexible design.

21 Claims, 4 Drawing Sheets

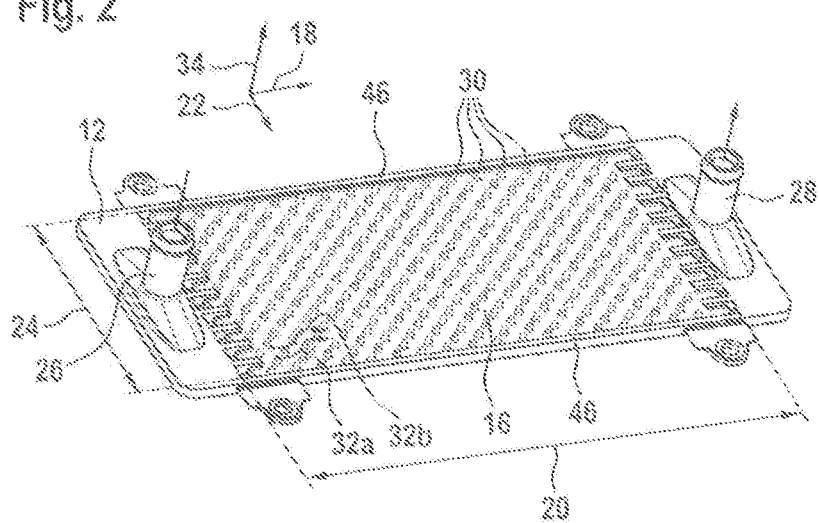
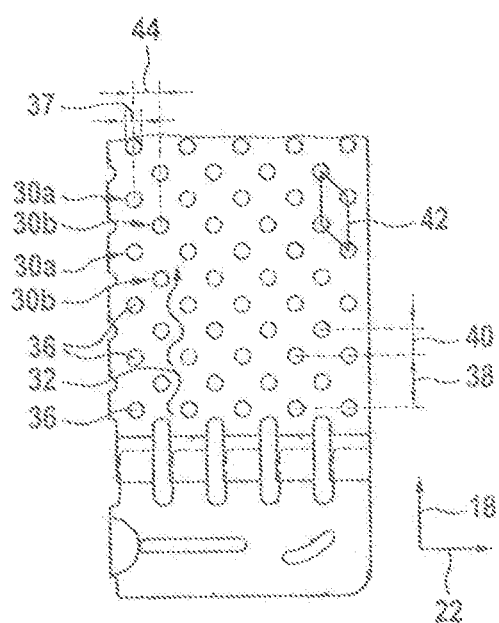

COOLING PLATE FOR CONTROLLING THE TEMPERATURE OF AT LEAST ONE BATTERY CELL, AND BATTERY SYSTEM

BACKGROUND OF THE INVENTION

The invention relates to a cooling plate for controlling the temperature of at least one battery cell. Furthermore, the invention also relates to a battery system comprising a cooling plate of this kind.

EP0516280A1 discloses cooling plates for controlling the temperature of traction battery cells which have flow ducts which are covered by a flexible cover for making thermal contact with the traction battery. Cooling plates of this kind have the disadvantage that reliable temperature control of the traction battery cells is not always possible.

SUMMARY OF THE INVENTION

The present invention describes a cooling plate for controlling the temperature of at least one battery cell, in particular for a traction battery. The cooling plate has a frame, which forms a flow chamber for a coolant to flow through, and a cover of flexible design. The cover of flexible design delimits the flow chamber in an at least partially fluid-tight manner and is provided for making thermal contact with the at least one battery cell. According to the invention, the cooling plate has at least one supporting element, which is arranged within the flow chamber and around which coolant can flow, for increasing the turbulence in the coolant flowing through the flow chamber and for supporting the at least one battery cell, which supporting element makes mechanical contact with the cover of flexible design.

This has the advantage that a cooling capacity or temperature control capacity which is improved compared to the prior art can be provided, so that reliable temperature control of the at least one battery cell is possible. In this case, the increase in turbulence which can be formed by means of the supporting element serves to thoroughly mix the coolant more intensively. In particular, a laminar flow which is formed within the flow chamber by the coolant, in particular a separating flow which is formed along a longitudinal direction of the cooling plate, is disturbed in such a manner that a temperature gradient perpendicular and/or parallel in relation to the longitudinal direction is minimized. For example, the supporting element has the effect of forming a turbulent flow with a formation of vortices in the coolant. For example, the supporting element preferably creates a flow with a Reynolds number exceeding 100, advantageously exceeding 1000, particularly advantageously exceeding 2000.

In addition, the cooling capacity or temperature control capacity is further improved since the supporting elements allow, in particular, thermal contact to be made with the battery cell in an improved manner in comparison to the prior art. Owing to an internal pressure which is generated within the cooling plate by the coolant flowing through the flow chamber, the cover of flexible design can be expanded or inflated at least in regions toward the outside. Regions of this kind of a cover of flexible design which is expanded or inflated toward the outside allow equalization of unevennesses on a surface of the battery cell which is provided for making thermal contact. Webs, which are formed along the longitudinal direction, for forming flow ducts are customary in the prior art, which webs are used for fastening the cover of flexible design. Cooling plates of this kind have regions which are expanded along the webs and in which the cover of flexible design cannot be expanded or inflated toward the outside by the internal pressure and therefore does not allow good tolerance equalization. The present invention is, in particular, an improvement over a prior art of this kind since, on account of the use of supporting elements around which fluid can flow, a surface of the cover of flexible design, which surface cannot be expanded or inflated toward the outside, is minimized for example, in particular is severely reduced in comparison to the prior art. Tolerance equalization is advantageously possible over largely an entire surface of the cover of flexible design.

In particular, a coolant is particularly preferably intended to be understood to mean a liquid coolant. The coolant preferably contains a water/glycol mixture. However, it goes without saying that embodiments with coolants which comprise gases and/or aerosols are also possible.

The frame preferably comprises a plate, in particular a plate of largely rectangular design. The frame and/or the plate is preferably formed at least partially from plastic. A geometry of the plate or a geometry of the cooling plate depends, in particular, on a geometry of the battery cell to be cooled, in particular a dimension of the battery cell to be cooled, so that thermal contact can be made with the battery cell by the cooling plate. The cooling plate or the plate is preferably of planar or largely planar design. A planar cooling plate is provided for making thermal contact on a planar side face of the battery cell. It is also conceivable for the cooling plate or the plate to have a curvature. This has the advantage that particularly good thermal contact can be made with the battery cell. In addition, this has the advantage that particularly stable and reliable mechanical contact-connection or connection between the battery cell and the cooling plate is possible.

The frame comprises a flow chamber. A flow chamber is intended to be understood to mean, in particular, a chamber region which is designed for a coolant to flow through and which is, in particular, of elongate design. In particular, it is intended to be understood that the flow chamber has a considerably greater extent in a longitudinal direction than in a direction which is arranged perpendicularly in relation to the longitudinal direction. In particular, a diameter of a flow cross-sectional area of the flow chamber, which flow cross-sectional area is oriented perpendicularly in relation to the longitudinal direction, is considerably smaller than a length of the flow chamber along the longitudinal direction. A considerably greater first length than a second length is intended to be understood to mean that the first length is greater than the second length at least by a factor of 2, preferably by a factor of 4, particularly preferably by a factor of 10. A considerably smaller first length than a second length is intended to be understood to mean that the first length is smaller than the second length at least by a factor of 2, preferably by a factor of 4, particularly preferably by a factor of 10. The flow chamber preferably has a base area which corresponds largely or substantially to a base area of the plate and/or a base area of the cooling plate.

In particular, a flow chamber is of open design at least in sections along its longitudinal direction. Openings or open regions of the flow chamber are preferably positioned such that they bear against the battery cell in the state mounted on the battery cell. In particular, it is conceivable for the openings or open regions of the flow chamber to be arranged perpendicularly or largely perpendicularly in relation to a cooling plate normal at least in sections. The situation of a first axis being arranged largely perpendicularly in relation to a second axis is intended to be understood to mean that the first axis forms with the second axis an angle which does not differ by more than 8°, advantageously does not differ by more than 5°, particularly advantageously does not differ by more than 2°, from 90°.

The flow chamber preferably has in each case two webs which are arranged on the frame and/or preferably on the plate. The webs preferably run at least largely parallel in relation to one another. Contact is preferably made with the two webs in a fluid-tight manner by the frame and/or by the plate. In particular, a coolant flowing through the flow chamber is delimited in a fluid-tight manner by the webs and the frame or the plate. A web is a boundary wall of the flow chamber. The situation of a first axis being arranged largely parallel in relation to a second axis is intended to be understood to mean that the first axis forms with the second axis an angle which does not differ by more than 8°, advantageously does not differ by more than 5°, particularly advantageously does not differ by more than 2°, from 0°.

The cover of flexible design is provided, by way of example, for delimiting the flow chamber in a fluid-tight manner. In particular, the cover of flexible design is provided for delimiting the open region or the open regions of the flow chamber in a fluid-tight manner. For example, the cover of flexible design can make contact with the webs of the flow chamber in a fluid-tight manner, so that a coolant flowing through the flow chamber is delimited in a fluid-tight manner by the webs, the cover of flexible design and the frame or the plate. This has the advantage that particularly good temperature control of the battery cell is possible since heat can be transmitted between the battery cell and the coolant in a particularly effective manner by the cover of flexible design. In particular, the use of a sufficiently thin cover of flexible design is possible, so that said cover has a particularly low thermal resistance.

A cover of flexible design is intended to be understood to mean, in particular, a cover which is elastically or at least partially elastically deformable. In particular, a cover of flexible design can be deformed by an acting force and is designed to be at least partially returned to its original shape after the acting force is removed. A cover of flexible design can be applied or can nestle against, in particular can make thermal contact with, the at least one battery cell particularly readily. This renders possible particularly efficient cooling of the battery cell.

A longitudinal direction of the cooling plate is intended to be understood to mean, in particular, a main direction of longitudinal extent of the cooling plate which preferably points in an intended flow direction of the coolant and/or in an average intended flow direction of the coolant.

The cooling plate is preferably formed in one piece with the frame. In this context, one piece is intended to be understood to mean, in particular, in a materially bonded manner, such as by a welding process and/or an adhesive bonding process etc. for example, and particularly advantageously integrally formed, such as by being produced from a casting and/or by being produced using a single- or multiple-component injection-molding process. This has the advantage that the cooling plate has a high degree of mechanical stability.

A supporting element is intended to be understood to mean, in particular, an element or component which changes, in particular reduces, a flow cross-sectional area of the flow chamber in sections. The supporting element is provided, in particular, for disturbing a laminar flow through the flow chamber, in particular for increasing turbulence of the flow. The supporting element is preferably integrally formed with the frame and/or with the plate and/or with a web. For example, the supporting element can be designed as an extension of the frame and/or of the plate and/or of a web. The situation of coolant being able to flow around the supporting element is intended to be understood to mean, in particular, that the supporting element is designed such that a circular flow flowing within the flow chamber or a flow which moves along a closed curve—particularly preferably a circular or largely circular curve—can flow around said supporting element, so that the supporting element is located within the circular flow or the closed curve, in particular that the circular flow or the closed curve can completely encircle or does completely encircle the supporting element at least once. In particular, the situation of the coolant being able to flow around the supporting element is intended to be understood to mean that the supporting element is designed such that a closed curve exists, which closed curve completely encircles the supporting element at least once or has a number of turns of at least one with respect to the supporting element and is arranged completely in the flow chamber.

Furthermore, a supporting element is intended to be understood to mean an element or component which is provided for supporting or making mechanical contact with the cover of flexible design. In particular, the supporting element can be provided to fasten the cover of flexible design, in particular to fasten said cover such that it is connected in a materially bonded manner.

Advantageous developments of the cooling plate are possible owing to the features cited in the dependent claims.

If the at least one supporting element has a round or oval or droplet-shaped or parallelogram-shaped cross-sectional area, this has the advantage that the turbulence of the coolant flowing through the flow chamber can advantageously be increased. The coolant can absorb a greater quantity of heat per unit time and per unit area, so that a possible temperature control capacity of the cooling plate is increased. In particular, a degree of the turbulence can be set by choosing the geometry or shape of the cross-sectional area. In this way, it is possible to match the cooling plate to the technical requirements made of the cooling plate, in particular to the requirements in respect of a temperature control capacity, in particular cooling capacity, and/or to the requirements in respect of a flow resistance of the cooling plate for the coolant.

A section element with a round or oval cross-sectional area has, in particular, the additional advantage that, when mechanical contact is made with the cover of flexible design, in particular when a connection is made with the cover of flexible design, particularly a materially bonded connection, in a contact-making region, there are no sharp corners which could lead to stress peaks when the cover of flexible design expands. Stresses in the cover of flexible design then have a uniform, circular and/or elliptical geometry. The cover of flexible design is then particularly durable and the cooling plate is particularly reliable.

A more uniform increase in turbulence over the entire cooling plate is rendered possible by way of a large number of first supporting elements being arranged in a first row along a longitudinal direction of the cooling plate, and a large number of second supporting elements being arranged in a second row along the longitudinal direction of the cooling plate. The large number of first supporting elements in the first row are preferably arranged in a uniform or equidistant manner. The large number of second supporting elements in the second row are preferably arranged in a uniform or equidistant manner. It is conceivable, in variants, for a further row or more than one further row to be arranged along the longitudinal direction of the cooling plate with a large number of supporting elements in each case. A uniformity of the increase in turbulence is further increased in this way.

If the second supporting elements of the second row are arranged in a manner offset in relation to the first supporting elements of the first row, this has the advantage that the coolant flowing through the flow chamber is additionally deflected in a direction which connects the first row to the second row. In particular, the coolant flowing through the flow chamber is additionally deflected in a direction perpendicular in relation to the longitudinal direction and parallel in relation to the cover of flexible design. In particular, the coolant flowing through the flow chamber is additionally deflected in a width direction of the cooling plate. For example, it is possible in this way for a flow of the coolant flowing through the flow chamber to run largely along a zigzag line or a sinuous line. In this way, the turbulence in the coolant flowing through the flow chamber is further increased, so that the temperature control capacity of the cooling plate can be further improved.

A width direction of the cooling plate is intended to be understood to mean, in particular, a main direction of width extent of the cooling plate which is preferably arranged perpendicularly or largely perpendicularly in relation to the intended flow direction or an average intended flow direction of the coolant. By way of example, the width direction is arranged perpendicularly or largely perpendicularly in relation to the longitudinal direction. The width direction is preferably arranged perpendicularly or largely perpendicularly in relation to the cooling plate normal.

A cooling plate in which in each case four supporting elements from amongst a large number of supporting elements form a parallelogram is particularly advantageous for increasing the turbulence. In this case, the situation of four supporting elements forming a parallelogram is intended to be understood to mean that the four supporting elements are arranged at the corners of an imaginary parallelogram. In this case, a parallelogram in which an internal angle is smaller than 90° is particularly advantageous. It is conceivable, in particular, for a large number of supporting elements to be arranged on a parallelogram grid, in particular on a rectangular grid.

The cooling plate is further improved when the cover of flexible design comprises at least one film, preferably a plurality of films, in particular is designed as a composite film. This ensures good heat transfer between the coolant and the battery cell with particularly durable sealing off of the flow chamber.

If the cover of flexible design is connected in a materially bonded manner to the frame, in particular to webs which delimit the flow chamber, this has the advantage that the fluid-tight sealing off of the flow chamber by the cover of flexible design is particularly secure and reliable. A materially bonded connection can be understood to mean, in particular, a connection by a sealing method, in particular hot-sealing method. A materially bonded connection can preferably be an adhesive bonding connection, a connection by vulcanization, a welded connection—in particular a laser-welded connection—and/or a soldered connection.

If the cover of flexible design is connected in a materially bonded manner to the at least one supporting element, this has the advantage that the fluid-tight sealing off of the flow chamber is further improved in respect of security and reliability by the cover of flexible design.

If the frame has a first connection which is provided for supplying the coolant, and if the frame has a second connection which is provided for discharging the coolant, this has the advantage that the cooling plate is particularly reliable and robust, in particular leakproof and sealed.

The cooling plate is preferably formed in one piece with the first connection and/or the second connection. This has the advantage that the cooling plate has a high degree of mechanical stability. The frame preferably has the first connection and/or the second connection. The frame is preferably formed in one piece with the flow chamber and/or the first connection and/or the second connection. At least one web of the flow chamber is preferably formed in one piece with the frame and/or with the plate of the frame.

A battery system comprising a cooling plate according to the present invention and a battery module, wherein the battery module has at least one battery cell and the at least one battery cell is arranged on the cover of flexible design, so that a thermal contact-connection is formed between the at least one battery cell and the cover of flexible design has, on account of the cooling plate always being able to provide a necessary cooling capacity, the advantage that the battery module has a particularly long expected service life.

BRIEF DESCRIPTION OF THE DRAWINGS

Exemplary embodiments of the cooling plate according to the present invention are shown in the drawings and explained in more detail in the following description. In the drawings FIG. 2 shows the first embodiment of the cooling plate according to the present invention without a cover of flexible design, FIG. 3 shows a plan view of the first embodiment of the cooling plate according to the present invention without a cover of flexible design.

DETAILED DESCRIPTION

Figure 1:
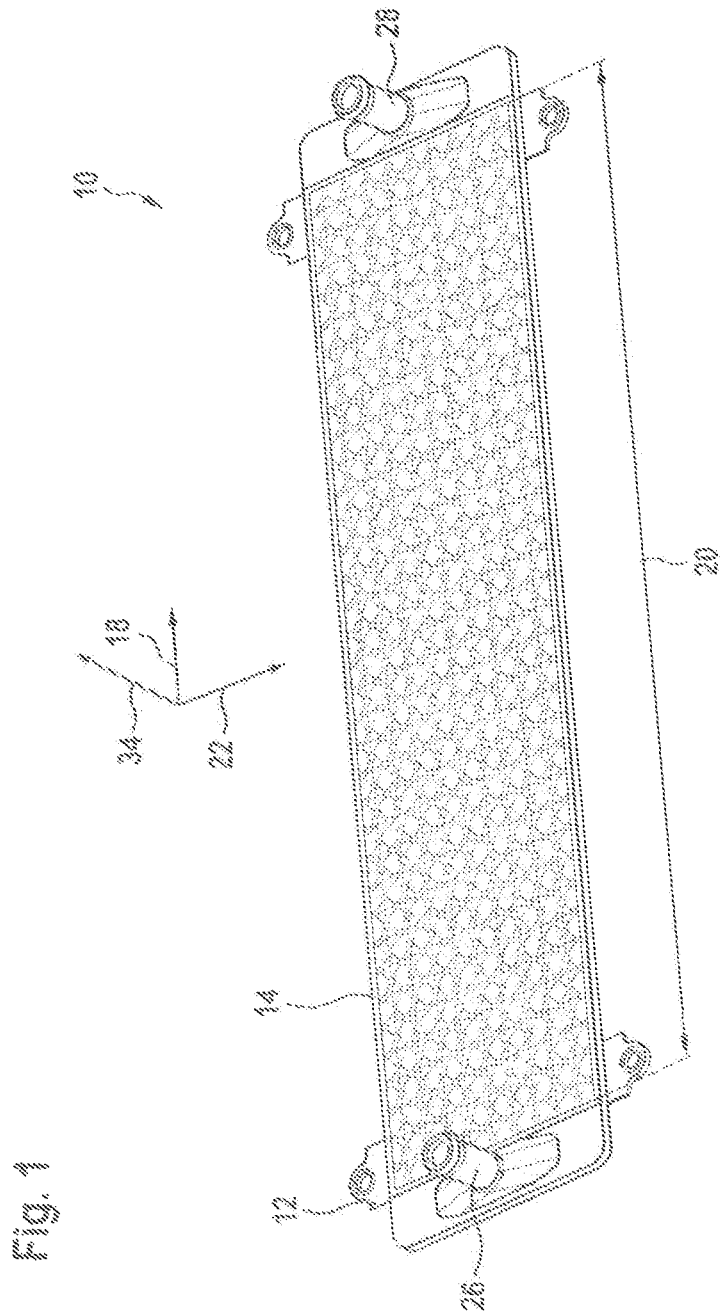
FIG. 1 shows a first embodiment of a cooling plate according to the present invention.

Identical parts are provided with the same reference numerals in the various design variants.

FIG. 1 shows a perspective view of an embodiment according to the invention of a cooling plate 10 for controlling the temperature of at least one battery cell.

The cooling plate 10 has a frame 12. In the exemplary embodiment shown according to FIG. 1, the frame is formed from plastic. The cooling plate 10 has a cover 14 of flexible design. The frame 12 has a flow chamber 16. The flow chamber 16 is covered or overlaid by the cover 14 of flexible design. In particular, the flow chamber 16 is closed off from an external environment by the cover 14 of flexible design.

FIG. 2 shows a perspective view of the frame 12 without the cover 14 of flexible design for the purpose of illustrating the flow chamber 16. Here, the flow chamber 16 has, in a longitudinal direction 18, a flow chamber length 20 of 40 cm for example. In alternative embodiments, the value of the flow chamber length 20 depends on the technical requirements, in particular on a dimensioning of the battery cell, such as the measurements. The flow chamber length 20 can lie, in particular, between 10 cm and 80 cm, preferably between 20 cm and 60 cm, particularly preferably between 30 cm and 50 cm.

In the exemplary embodiment shown in FIG. 2, the flow chamber 16 has, for example, a flow chamber width 24 of 10 cm in a width direction 22. In alternative embodiments, the value of the flow chamber width 24 depends on the technical requirements, in particular on a dimensioning of the battery cell, such as the measurements. The flow chamber width 24 can lie, in particular, between 2 cm and 20 cm, preferably between 5 cm and 15 cm, particularly preferably between 7 cm and 12 cm.

The flow chamber 16 has a large number of supporting elements 30. In this case, the supporting elements 30 are arranged within the flow chamber 16. For example, the supporting element 30 is arranged such that a coolant flowing through the flow chamber 16 can flow around it. A coolant flowing through the flow chamber 16 can be disturbed, for example, by means of the supporting elements 30 in such a way that, for example, the turbulence of the coolant can be increased.

The frame 12 has, for example, a first connection 26 which is provided for supplying a coolant. The frame 12 has, for example, a second connection 28 which is provided for discharging or draining the coolant. FIG. 2 illustrates an intended flow profile of the coolant during operation of the cooling plate 10. The coolant flows into the cooling plate 10 through the first connection 26. The coolant then flows through the flow chamber 16. Within the flow chamber 16, the coolant flows, on average, for example along the longitudinal direction 18. In preferred embodiments, an average flow direction 26 is arranged parallel or largely parallel in relation to the longitudinal direction 18. The average flow direction identifies, in particular, a flow direction of the coolant averaged over time and/or over a flow cross-sectional area of the flow chamber. In the exemplary embodiment illustrated in FIG. 2, the coolant flows around the supporting elements 30. A respective flow path 32a and 32b along which in each case two fluid elements of the cooling liquid flow is illustrated in FIG. 2. The flow paths 32 each run along a sinuous line around the supporting elements 30. The coolant then flows out of the cooling plate 10 through the second connection 28.

FIG. 3 shows a plan view of a detail of a cooling plate 10 without the cover 14 of flexible design according to FIG. 2. FIG. 3 shows a view of the cooling plate 10 along a cooling plate normal 34. The supporting elements 30 have, for example, a round cross-sectional area 36. By way of example, the supporting elements 30 and/or the cross sectional area 36 have a diameter 37 of 3 mm. In alternative embodiments, the value of the diameter 37 depends on the technical requirements, in particular on the requirements in respect of a temperature control capacity, in particular cooling capacity, and/or the requirements in respect of a flow resistance of the cooling plate 10 for the coolant.

By way of example, a large number of first supporting elements 30a is arranged in a first row along the longitudinal direction 18. A large number of second supporting elements 30b are arranged, by way of example, in a second row along the longitudinal direction 18.

The first supporting elements 30a within the first row are arranged, for example, in an equidistant manner. The first supporting elements 30a each have, within the first row, an identical supporting element spacing 38 in relation to their respectively nearest first supporting elements 30a of the first row. In the exemplary embodiment, the supporting element spacing 38 is, for example, 1.0 cm. In alternative embodiments, the value of the supporting element spacing 38 depends on the technical requirements, in particular on a dimensioning of the battery cell and/or on a dimensioning—for example a length—of the flow chamber 16. The value of the supporting element spacing 38 preferably depends on the requirements in respect of temperature control capacity, in particular cooling capacity, and/or the requirements in respect of a flow resistance of the cooling plate 10 for the coolant. In the exemplary embodiment shown in FIG. 3, the second supporting elements 30b within the second row are arranged, for example, in an equidistant manner. The second supporting elements 30b each have, within the second row, the supporting element spacing 38 in relation to their respectively nearest second supporting elements 30b of the second row.

In the exemplary embodiment, the second supporting elements 30b of the second row are arranged offset by an offset length 40 in relation to the first supporting elements 30a of the first row. The offset length 40 is, in particular, a spacing along the longitudinal direction 18 between a first supporting element 30a and the nearest second supporting element 30b or a projection of a distance between a first supporting element 30a and the nearest second supporting element 30b in the longitudinal direction 18. In the exemplary embodiment, the offset length 40 is, for example, 0.5 cm or 50% of the supporting element spacing 38. In advantageous variants, the offset length 40 is between 10% and 40% of the supporting element spacing 38, particularly advantageously between 20% and 30%.

In the exemplary embodiment, in each case four supporting elements 30 from amongst a large number of supporting elements 30 form a parallelogram 42.

By way of example, the first row of first supporting elements 30a and the second row of second supporting elements 30b are arranged parallel in relation to one another. In advantageous variants, the first row of first supporting elements 30a and/or the second row of second supporting elements 30b are arranged parallel or largely parallel in relation to the longitudinal direction 18. In the exemplary embodiment shown in FIG. 3, the first row of first supporting elements 30a and the second row of second supporting elements 30b have a row spacing 44 in relation to one another. For example, the row spacing 44 is 0.5 cm. The row spacing 44 is advantageously oriented parallel or largely parallel in relation to the width direction 22. In alternative embodiments, the value of the row spacing 44 depends on the technical requirements, in particular on a dimensioning of the battery cell and/or on a dimensioning—for example a length—of the flow chamber 16. The value of the row spacing 38 preferably depends on the requirements in respect of temperature control capacity, in particular cooling capacity, and/or the requirements in respect of flow resistance of the cooling plate 10 for the coolant. In variants, the row spacing 43 is between 3% and 30% of the flow chamber width 24, advantageously between 5% and 20%, particularly advantageously between 10% and 15%.

In the exemplary embodiment, the flow chamber 16 is delimited, by way of example, by two webs 46. The webs 46 are, for example, each arranged parallel in relation to the longitudinal direction 18.

In the exemplary embodiment, the cover 14 of flexible design is designed, for example, as a composite film. The cover 14 of flexible design is connected, by way of example, in a materially bonded manner to the webs 46. In the exemplary embodiment, the materially bonded connection between the cover 14 of flexible design and the frame 12 or the webs 46 is produced, for example, by a sealing process or a sealing method.

In the exemplary embodiment shown in FIG. 1, the cover 14 of flexible design is connected, for example, to the supporting elements 30. By way of example, the cohesive connection between the cover 14 of flexible design and the supporting elements 30 is produced by a sealing process or a sealing method.

In FIG. 1, the cooling plate 10 is shown in a state in which the cover 14 of flexible design is inflated by an internal pressure which is produced by the coolant flowing through the flow chamber 16.

Figure 4:
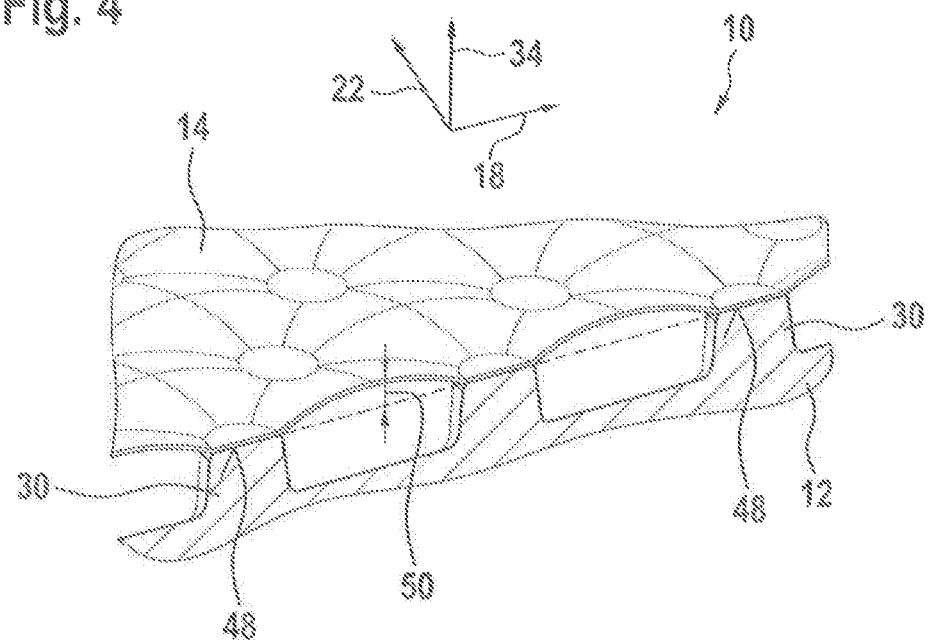
FIG. 4 shows a sectional view of a detail of the first embodiment.

FIG. 4 shows a sectional illustration of a detail of a cooling plate 10 according to FIG. 1. In FIG. 4 as well, the cooling plate 10 is shown in a state in which the cover 14 of flexible design is inflated by an internal pressure which is produced by the coolant flowing through the flow chamber 16.

The supporting elements 30 are advantageously of cylindrical design at least in sections, preferably of largely cylindrical design. By way of example, a cylinder axis of the supporting elements 30 which are of cylindrical design at least in sections and/or an axis of symmetry of the supporting elements 30 are/is oriented parallel or largely parallel in relation to the cooling plate normal 34.

The supporting elements 30 are preferably of cylindrical design at least in sections or largely of cylindrical design or designed as a general cylinder with a circular base area or circular cross section. In alternative variants, the supporting elements 30 are designed at least in sections or largely as a general cylinder with an elliptical and/or parallelogram-shaped and/or polygonal base area or cross section.

In the exemplary embodiment shown in FIG. 4, the supporting elements 30 have a, for example, round or circular connecting area 48. The connecting area 48 is provided for making mechanical contact with, in particular supporting and/or fastening, the cover 14 of flexible design. In the exemplary embodiment shown in FIG. 4, the cover 14 of flexible design is connected in a cohesively bonded manner to the connecting areas 48 of the supporting elements 30. The connecting areas are advantageously arranged perpendicularly or largely perpendicularly in relation to the cooling plate normal 34.

It is conceivable, in variants, for the connecting area 48 to be of at least partially round or circular and/or largely round or circular and/or ellipsoidal or elliptical and/or parallelogram-shaped and/or polygonal design.

A supporting element 30 with a round and/or oval connecting area 48 has, in particular, the advantage that, when mechanical contact is made with the cover 14 of flexible design, in particular when connection is made with the cover 14 of flexible design, particularly a materially bonded connection, on the connecting area 48, there are no sharp corners which could lead to stress peaks when the cover 14 of flexible design expands. Stresses in the cover 14 of flexible design then have a uniform, circular and/or elliptical geometry. The cover 14 of flexible design is then particularly durable and the cooling plate 10 is particularly reliable.

In the exemplary embodiment shown in FIG. 4, the cover 14 of flexible design is expanded toward the outside or in the direction of the cooling plate normal 34 by an expansion width 50 owing to the internal pressure of the coolant flowing through the flow chamber 16. This has the advantage that unevennesses in a surface of the battery cell, which surface is provided for making contact with the cooling plate 10, which are smaller than the value of the expansion width 50 can be equalized. This improves the thermal contact-connection. It is therefore particularly advantageous when the unevennesses of the battery cell on a surface region, which is as large as possible, of the cooling plate 10 or of the cover 14 of flexible design can be equalized. The inflated film structure shown in FIGS. 1 and 4, on account of an arrangement of the supporting elements 30, is particularly advantageous since the expansion width 50 of the cover 14 of flexible design is relatively large over wide regions of the surface area.

Figure 5:
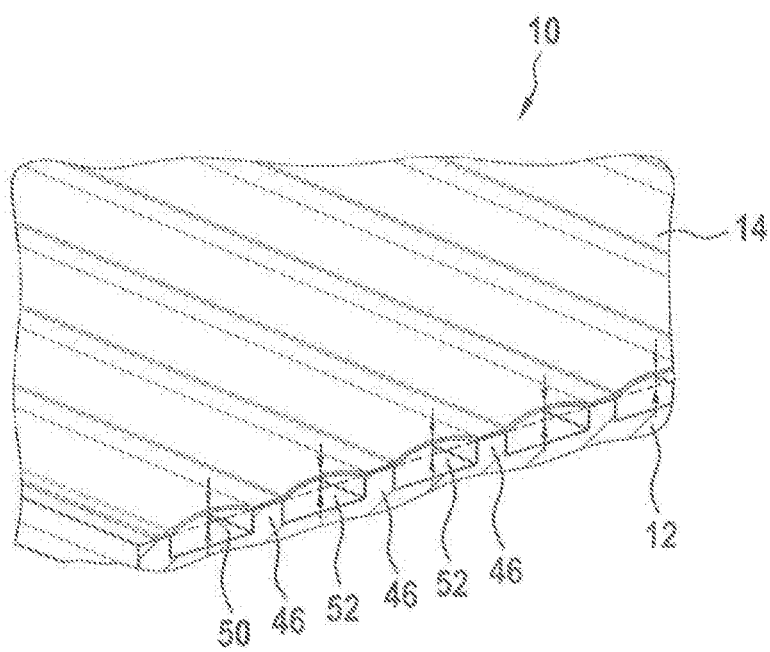
FIG. 5 shows a sectional view of a detail of a cooling plate from the prior art.

For comparison purposes, a sectional illustration of a detail of a cooling plate 10 from the prior art is shown in FIG. 5. In the cooling plate 10 according to the prior art, the cooling liquid flows through ducts 52 which are oriented parallel in relation to the longitudinal direction 18 and which are delimited by webs 46. In the cooling plate shown in FIG. 5, the cover 14 of flexible design is expanded toward the outside or in the direction of the cooling plate normal 34 by an expansion width 50 owing to the internal pressure of the coolant flowing through the flow chamber 16. The cover 14 of flexible design is connected in a materially bonded manner to the webs 46. For this reason, there are, on the cover 14 of flexible design, expanded longitudinal regions along the webs which cannot expand toward the outside owing to an internal pressure. In these regions, no equalization of unevennesses of the battery cell is possible, this possibly leading to a poor thermal contact-connection. In the cooling plates 10 according to the present invention, the regions in which the cover 14 of flexible design cannot be expanded toward the outside owing to an internal pressure are restricted to the positions of the supporting elements 30 or the connecting areas 48.

Figure 6:
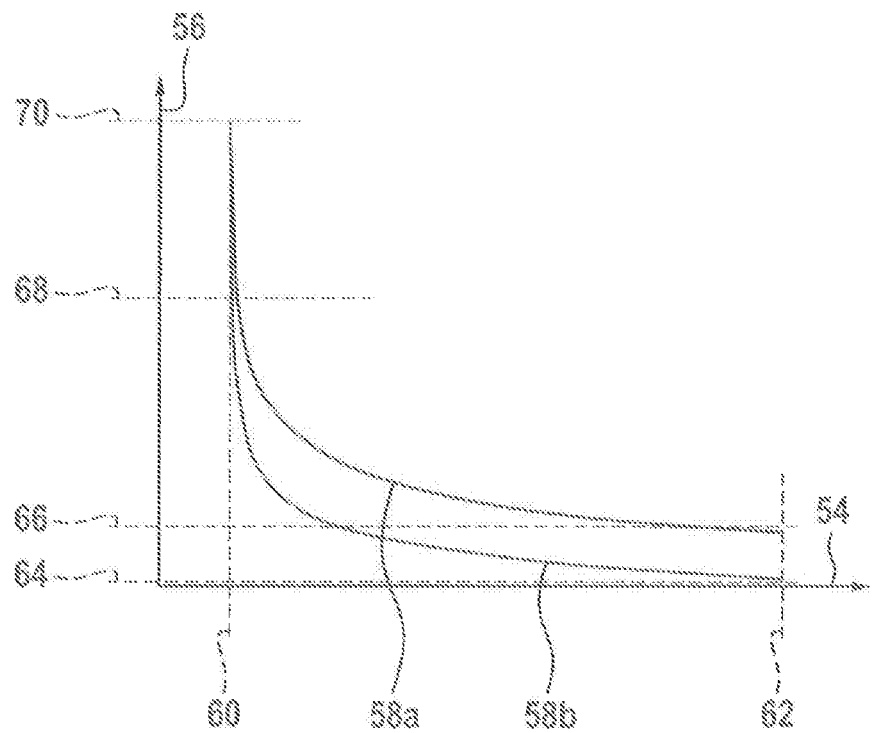
FIG. 6 shows an illustration of a heat transfer coefficient over a longitudinal direction.

FIG. 6 shows a profile of a heat transfer coefficient along the longitudinal direction 18. A length position along the longitudinal direction 18 of the cooling plate 10 is shown on an L abscissa axis 54. An ordinate axis 56 shows a value of the heat transfer coefficient. A first curve 58a illustrates the profile of the heat transfer coefficient along the longitudinal direction 18 in the exemplary embodiment. A starting position 60 of a duct length on the abscissa axis 54 has the value 0 mm. An end position 62 of the duct length on the abscissa axis has the value 400 mm. A first coefficient value 64 of the heat transfer coefficient on the ordinate axis 56 has the value 500 W/m^2/K. The heat transfer coefficient has the unit watts per square meter and per kelvin. A second coefficient value 66 of the heat transfer coefficient on the ordinate axis 56 has the value 800 W/m^2/K. A third coefficient value 68 of the heat transfer coefficient on the ordinate axis 56 has the value 2000 W/m^2/K. A fourth coefficient value 70 of the heat transfer coefficient on the ordinate axis 56 has the value 3000 W/m^2/K. A second curve 58b shows, for comparison purposes, the profile of the heat transfer coefficient along a duct 52 in a cooling plate 10 according to the prior art with ducts 52 instead of supporting elements 30, as shown in FIG. 5. The heat transfer coefficient of the cooling plate 10 of the exemplary embodiment is significantly increased in comparison to the cooling plate 10 of the variant with ducts 52 along the entire longitudinal direction 18 of the cooling plate 10.

The invention claimed is:

1. A cooling plate (10) for controlling the temperature of at least one battery cell, the cooling plate having a frame (12), which forms a flow chamber (16) for a coolant to flow through, and a flexible cover (14), which delimits the flow chamber (16) in an at least partially fluid-tight manner and which is provided for making thermal contact with the at least one battery cell, characterized in that the cooling plate (10) has at least one supporting element (30), which is fixed to the frame (12), which is arranged within the flow chamber (16) and around which coolant can flow, the supporting element (30) being configured for increasing turbulence in the coolant flowing through the flow chamber (16) and for supporting the at least one battery cell, and the supporting element making mechanical contact with the flexible cover (14), wherein at least one portion of the flexible cover (14) is fixed to the at least one supporting element (30), wherein the flexible cover (14) is elastically deformable and is configured to expand in a direction moving away from the frame (12) due to internal pressure of the coolant flowing through the flow chamber (16), and wherein the flexible cover (14) is restricted from expanding at the at least one portion of the flexible cover (14) that is fixed to the at least one supporting element (30).

2. The cooling plate (10) according to claim 1, characterized in that the at least one supporting element (30) has a round or oval or droplet-shaped or parallelogram-shaped cross-sectional area (36).

3. The cooling plate (10) according to claim 1, characterized in that the at least one supporting element (30) includes at least ten first supporting elements (30a) arranged in a first row along a longitudinal direction (18) of the cooling plate (10), and at least ten second supporting elements (30b) arranged in a second row along the longitudinal direction (18) of the cooling plate (10).

4. The cooling plate (10) according to claim 3, characterized in that the second supporting elements (30b) are arranged in a manner offset in relation to the first supporting elements (30a).

5. The cooling plate (10) according to claim 1, characterized in that the at least one supporting element (30) includes at least ten supporting elements (30), of which four supporting elements (30) form a parallelogram (42).

6. The cooling plate (10) according to claim 1, characterized in that the flexible cover (14) comprises at least one film.

7. The cooling plate (10) according to claim 1, characterized in that the flexible cover (14) is connected in a materially bonded manner to the frame (12).

8. The cooling plate (10) according to claim 1, characterized in that the flexible cover (14) is connected in a materially bonded manner to the at least one supporting element (30).

9. The cooling plate (10) according to claim 1, characterized in that the frame (12) has a first connection (26) which is configured for supplying the coolant, and in that the frame (12) has a second connection (28) which is configured for discharging the coolant.

10. The cooling plate (10) according to claim 1, characterized in that the flexible cover (14) comprises a plurality of films.

11. The cooling plate (10) according to claim 1, characterized in that the flexible cover (14) comprises a composite film.

12. The cooling plate (10) according to claim 1, characterized in that the flexible cover (14) is connected in a materially bonded manner to webs (46) which delimit the flow chamber (16).

13. A battery system comprising a cooling plate (10) according to claim 1 and a battery module, wherein the battery module has at least one battery cell and the at least one battery cell is arranged on the flexible cover (14), so that a thermal contact-connection is formed between the at least one battery cell and the flexible cover (14).

14. The battery system according to claim 13, characterized in that the at least one supporting element (30) has a round or oval or droplet-shaped or parallelogram-shaped cross-sectional area (36).

15. The battery system according to claim 13, characterized in that the at least one supporting element (30) includes at least ten first supporting elements (30a) arranged in a first row along a longitudinal direction (18) of the battery system, and at least ten second supporting elements (30b) arranged in a second row along the longitudinal direction (18) of The battery system.

16. The battery system according to claim 15, characterized in that the second supporting elements (30b) are arranged in a manner offset in relation to the first supporting elements (30a).

17. The battery system according to claim 13, characterized in that the at least one supporting element (30) includes at least ten supporting elements (30), of which four supporting elements (30) form a parallelogram (42).

18. The battery system according to claim 13, characterized in that the flexible cover (14) comprises at least one film.

19. The battery system according to claim 13, characterized in that the flexible cover (14) is connected in a materially bonded manner to the frame (12).

20. The battery system according to claim 13, characterized in that the flexible cover (14) is connected in a materially bonded manner to the at least one supporting element (30).

21. The cooling plate (10) according to claim 3, wherein the frame (12) has a planar surface partially defining the flow chamber (16), and wherein the at least one supporting element (30) extends from the planar surface of the frame (12).

* * * * *